Patented Aug. 21, 1934

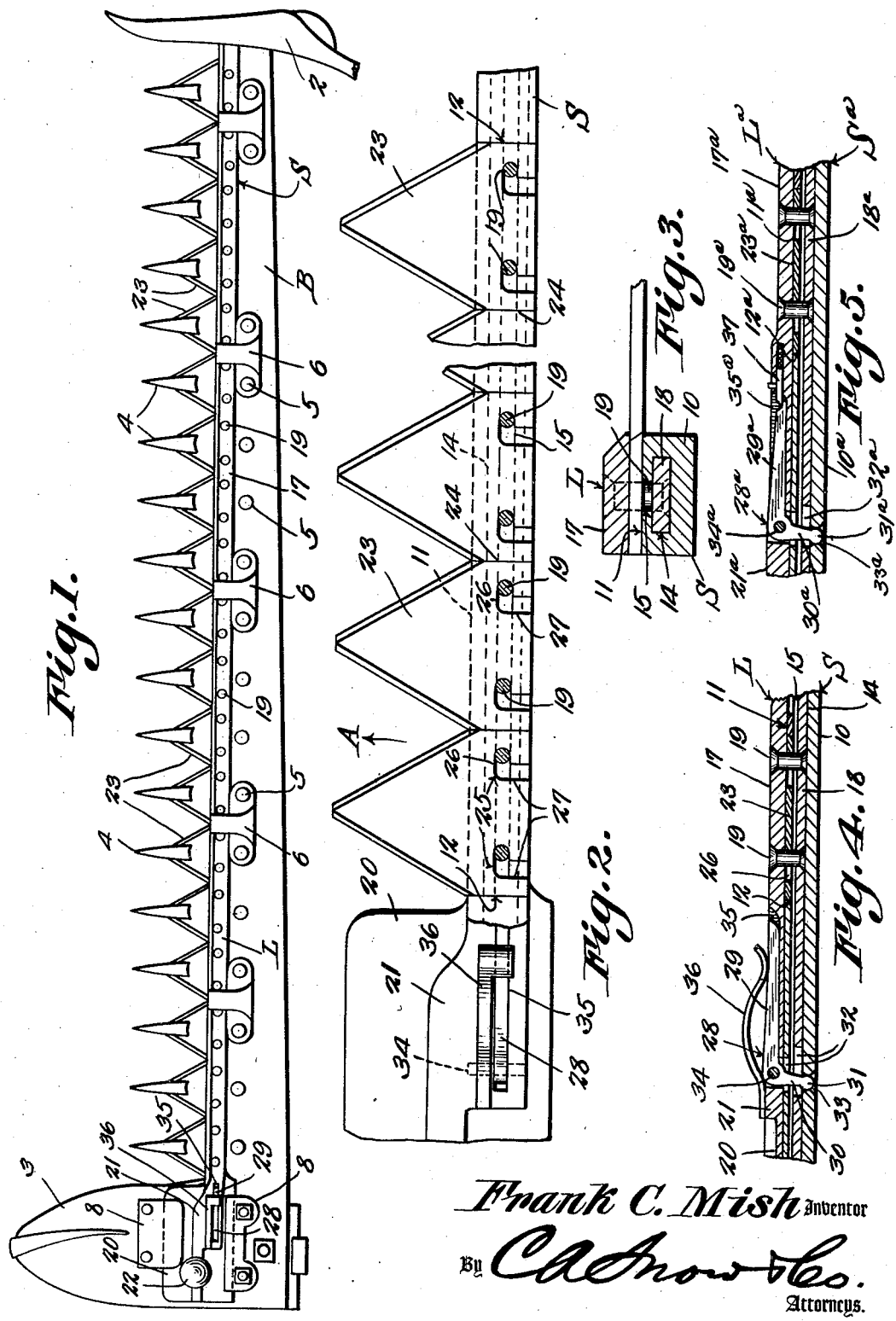

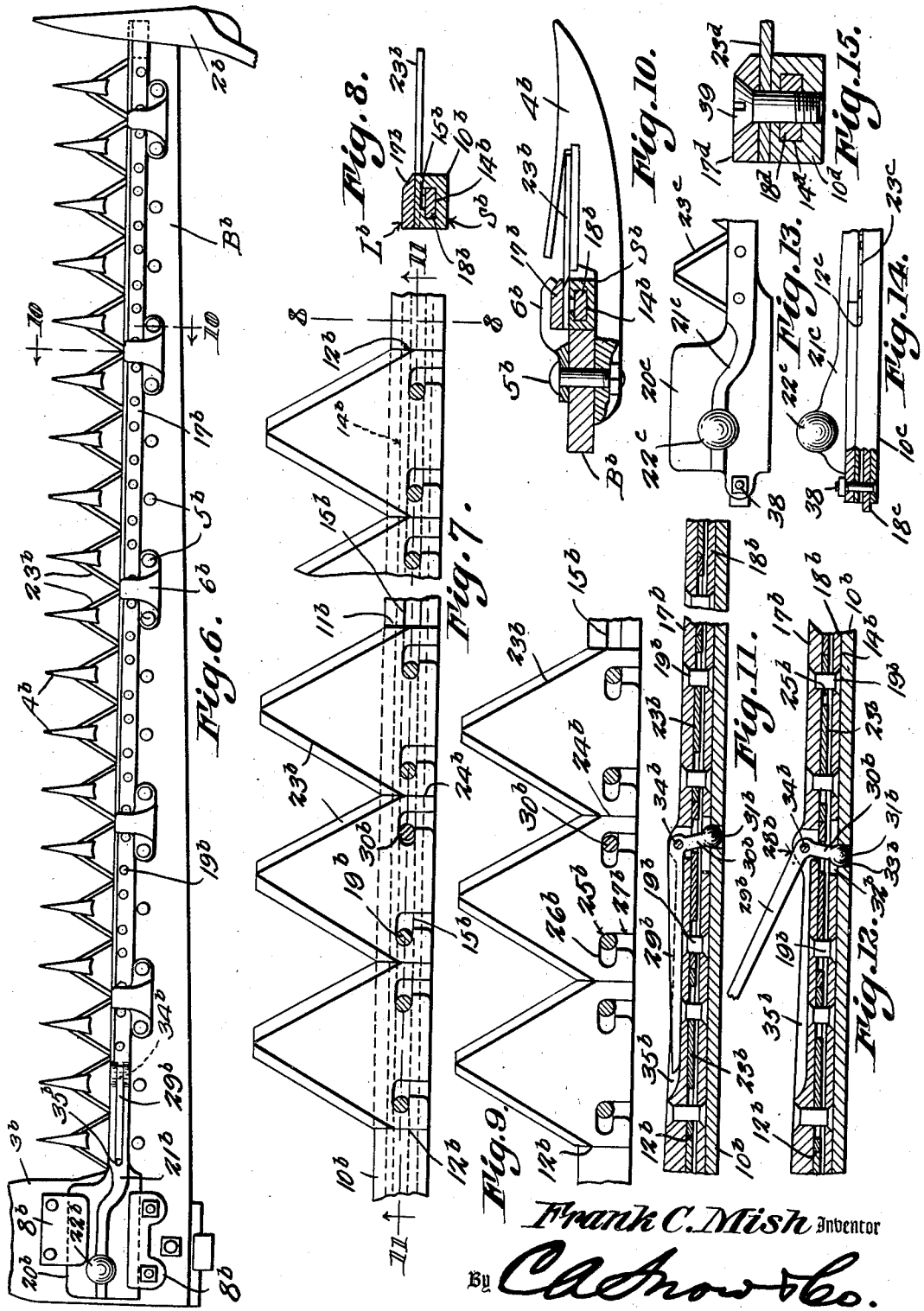

1,970,668

UNITED STATES PATENT OFFICE 1,970,668

CUTTER FOR MOWING MACHINES

Frank Chesley Mish, Greenville, Va.

Application November 27, 1933, Serial No. 699,952

9 Claims. (Cl. 56—300)

This invention aims to provide a simple means whereby any tooth on the sickle bar of a mower may be removed readily for renewal, replacement or repair.

It is within the province of the disclosure to improve generally and to enhance the utility of devices of that type to which the invention appertains.

With the above and other objects in view, which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

In the accompanying drawings:

Fig. 1 shows in top plan, a device constructed in accordance with the invention;

Fig. 2 is a top plan of the sickle bar, with parts removed;

Fig. 3 is a transverse section taken through the sickle bar and the slide;

Fig. 4 is a fragmental longitudinal section;

Fig. 5 is a fragmental longitudinal section showing a modification in the means for retaining the bell-crank lever;

Fig. 6 is a top plan showing a modification in the seats of the teeth and adjacent parts;

Fig. 7 is a top plan of the base of the sickle bar, with parts removed;

Fig. 8 is a cross section on the line 8—8 of Fig. 7;

Fig. 9 is a fragmental top plan, showing the teeth in position which they will assume when they are about ready to be removed;

Fig. 10 is a cross section on the line 10—10 of Fig. 6;

Fig. 11 is a longitudinal section on the line 11—11 of Fig. 7, showing the teeth and corresponding parts in the positions of Fig. 7;

Fig. 12 is a longitudinal section on the line 11—11 of Fig. 7, the view showing the teeth and cooperating parts in the position of Fig. 9;

Fig. 13 is a fragmental top plan showing a modification;

Fig. 14 is an elevation of the structure shown in Fig. 13, parts being broken away;

Fig. 15 is a transverse section showing a modification.

In the form shown in Figs. 1 to 4 of the drawings, the letter B marks the cutter bar of a mowing machine, the cutter bar having a shoe 2 at its outer end, and a shoe 3 at its inner end. The guards 4, with which the teeth 23 cooperate, are attached to the under-surface of the cutter B by securing elements 5. Certain of these securing elements 5 serve, also, to attach clips 6 to the upper surface of the cutter bar. Clips 8 are attached to the inner end of the cutter bar B and to its shoe 3.

A sickle bar S is mounted to reciprocate on the guards 4, under the clips 6 and against the forward edge of the cutter bar B.

The sickle bar S is a composite structure. It includes a base 10, which has a recess 11 in its upper surface, the recess 11 forming transverse shoulders 12 in the upper surface of the base 10 of the sickle bar S. The base 10 has an internal longitudinal guideway 14. In the top of the base 10, between the shoulders 12, there is a longitudinal slot 15 which opens downwardly into the guideway 14.

A slide L forms part of the sickle bar S. The part L is called a slide because it has a small amount of longitudinal movement with respect to the base 10 of the sickle bar S, at the will of an operator, in order to engage and set free the teeth 23 that are carried by the base 10 of the sickle bar, as hereinafter described. The sliding movement of the part L takes place only when the teeth 23 are to be removed or replaced. In the operation of the sickle bar S, during the mowing operation, the slide L and the base 10 of the sickle bar S reciprocate as one piece, a statement which will be better understood after the construction of the device has been gone into a little more fully.

The slide L embodies an upper strip 17, located on top of the base 10 of the sickle bar S, and a lower strip 18 received slidably in the guideway 14 of the base 10. Connections 19, such as rivets or pins, join the upper strip 17 and the lower strip 18 together, to form the slide L, the connections 19 being received slidably in the slot 15 of the base 10 of the sickle bar S. The upper strip 17 of the slide L is provided with an enlargement 20, received slidably under the clips 8 which are located at the inner end of the cutter bar B. The upper strip 17 of the slide L has an upstanding longitudinal rib 21 at its inner end, the part 21 terminating in a ball 22, to which the actuating pitman (not shown) for the sickle bar S is connected.

As shown in Fig. 2, the teeth 23 are mounted in the recess 11 of the base 10 of the sickle bar S, and have their inner edges in abutment, as shown at 24, the outer transverse edges of the terminal teeth engaging the shoulders 12 that are formed in the base 10 of the sickle bar S, at the ends of the recess 11. The line of teeth 23, therefore, cannot move longitudinally of the sickle bar S. The teeth 23 are disposed on top of the base 10, in the recess 11, and underneath the upper member 17 of the slide L. Consequently, the teeth 23 cannot move vertically.

The teeth 23 are provided in their rear edges with L-shaped seats 25, each comprising a part 26 extending outwardly and longitudinally of the slide L, and a part 27 disposed transversely of the slide, the part 27 opening through the rear edge of each tooth 23, as shown in Fig. 2. It is clear that if the connections 19 that join together the members 17 and 18 of the slide L are received in the parts 26 of the seats 25 in the teeth 23, and if the slide L is prevented from moving endwise, the teeth 23 will be held detachably in place, against movement in any direction, and particularly against removal transversely of the sickle bar S, in the direction of the arrow A of Fig. 2.

It may now be assumed that an adequate and effective means is provided for securing the teeth 23 to the sickle bar S, but the present invention concerns itself chiefly with the problem of taking out any tooth 23, for removal or repair. Having that consideration in mind, an operating and holding means is provided for the slide L, and that means may be in the form of a bell crank lever 28, including a long outwardly extended arm 29, and a short depending arm 30 terminating in a ball 31. The short depending arm 30 of the bell crank lever 29 extends downwardly through openings 32 in the slide L, and the ball 31 on the lower end of the short arm 30 of the bell crank lever 28 is received in a socket 33 formed in the base 10 of the sickle bar S. The bell crank lever 28 is fulcrumed at 34 on the rib 21 of the upper strip 17 of the slide L. The long arm 29 of the bell crank lever 28 is received in a slot 35 formed in the part 21 of the slide L. The slot 35 is somewhat longer than the arm 29 of the bell crank lever 28, as shown in Fig. 4, so that a tool (not shown) may be inserted under the free end of the long arm 29 of the bell crank lever, to swing that arm of the bell crank lever upwardly. The long arm 29 of the bell crank lever 28 is held in the slot 35 by a spring 36, one end of which is secured to the part 21 of the slide L, and the other end of which bears on the upper edge of the arm 29 of the bell crank lever 28.

When the parts are in the positions shown in Fig. 4, with the long arm 29 of the bell crank lever 28 in the slot 35 of the slide L, the connections 19 that form part of the slide are received in the parts 26 of the seats 25 in the teeth 23, and the teeth 23 are held firmly in place, in the position shown in Fig. 2. By raising the free end of the long arm 29 of the bell crank lever 28, against the action of the spring 36, the bell crank lever moves the slide inwardly, because the ball 31 at the end of the short arm 30 of the bell crank lever 28 has pivotal movement in the socket 33 that is formed in the base 10 of the sickle bar S. An inward longitudinal movement is imparted to the slide L, as aforesaid, the connections 19 of the slide are carried to the left in Fig. 2 and are opposite to the parts 27 of the seats 25 in the teeth 23, and any tooth 23 may be removed, in the direction of the arrow A of Fig. 2. After a new tooth has been put in, the bell crank lever 28 is restored to the position of Fig. 4, the connections 19 of the slide L resume their positions in the parts 26 of the seats 25 of the teeth 23, and the teeth are held securely in position on the sickle bar S, for reciprocation, with the sickle bar S, on the cutter bar B.

In Fig. 5, parts hereinbefore described have been designated by numerals previously used, with the suffix "a". The modification contemplated in Fig. 5 comprises replacing the spring 36 with a different means for holding the bell crank lever 28a in the position of Fig. 5. That means is a latch 37, slidably mounted in the member 17a of the slide, and engaging the end of the long arm 29a of the bell crank lever.

In Figs. 6 to 12, parts hereinbefore described have been designated by numerals previously used, with the suffix "b". In this form of the invention, the longitudinal parts 26b of the seats 25b in the teeth 23b extend inwardly instead of outwardly, and the long arm 29b of the bell crank lever 28b extends inwardly. The short arm 30b of the bell crank lever 28b takes the place of one of the connections 19b and cooperates with one of the tooth-seats 25b. The general operation of the structure shown in Figs. 6 to 12 does not differ from the operation of the structure shown in Figs. 1 to 4.

In Figs. 13 and 14, parts hereinbefore described have been designated by numerals previously used, with the suffix "c". The modification contemplated comprises dispensing with the actuating bell crank lever 28, operating the slide directly by hand, and holding the parts in the position of Fig. 2 of the drawings by means of a securing device, such as a bolt 38, extended through the inner end of the slide L and the sickle bar S, to hold these parts together, for movement as one piece.

In Fig. 15, parts hereinbefore described have been designated by numerals previously used, with the suffix "d". The modification comprises using a securing element 39, such as a screw, to connect the slide with the base 10d of the sickle bar, the securing element 39 being located anywhere along the length of the sickle bar.

Having thus described the invention, what is claimed is:

1. In a device of the class described, a sickle bar comprising a base having an internal longitudinal guideway, the base being provided in its upper edge with a recess defining shoulders at the ends of the recess, the base having a longitudinal slot connecting the guideway with the recess, teeth removably mounted in the recess, the outer transverse edges of the terminal ones of the teeth being engaged with the shoulders, the teeth having seats in their rear edges; and a slide comprising a lower member mounted for reciprocation in the guideway, an upper member slidable on top of the base and closing the top of the recess, the upper member being engaged with the uper surfaces of the teeth, and connections joining said members of the slide, said connections being engaged with the seats of the teeth and being received slidably in the slot.

2. In a device of the class described, a sickle bar comprising a base, provided in its upper edge with a recess defining shoulders at the ends of the recess, teeth removably mounted in the recess, with their inner edges in abutment, and with the outer transverse edges of the terminal ones of the teeth in engagement with the shoulders, and a slide mounted to reciprocate on the base and closing the top of the recess, over the upper surfaces of the teeth, the slide comprising teeth-retaining parts, and the teeth having elements engageable with said teeth-retaining parts.

3. In a device of the class described, a sickle bar comprising a base having an internal longitudinal guideway, the base being provided in its top with a longitudinal slot which opens downwardly into the guideway, teeth mounted on the top of the base, and provided in their edges with angularly arranged seats, means for retaining the teeth against movement longitudinally of the base; and a slide comprising a lower member mounted for reciprocation in the guideway, an upper member slidable on top of the teeth, and connections joining the upper and lower members of the slide, said connections being slidably received in the slot and being engaged with the seats of the teeth.

4. A device of the class described, constructed as set forth in claim 3, in combination with releasable means extended downwardly through the upper and lower members of the slide, and engaging the base, to hold the slide against movement.

5. A device of the class described, constructed as set forth in claim 3, in combination with means for moving the slide, said means being a bell crank lever fulcrumed on the upper member of the slide, the bell crank lever comprising an operating arm disposed above the upper member of the slide and a depending arm extended downwardly through the lower member of the slide, the base having means for engaging the depending arm of the bell crank lever.

6. A device of the class described, constructed as set forth in claim 3, in combination with means for moving the slide, said means being a bell crank lever fulcrumed on the upper member of the slide, the bell crank lever comprising an operating arm disposed above the upper member of the slide and a depending arm extended downwardly through the lower member of the slide, the base having means for engaging the depending arm of the bell crank lever, and means on the upper member of the slide for engaging the operating arm to hold the bell crank lever releasably against movement.

7. A device of the class described, constructed as set forth in claim 3, in combination with means for moving the slide, said means being a bell crank lever fulcrumed on the upper member of the slide, the bell crank lever comprising an operating arm disposed above the upper member of the slide, and a depending arm extended downwardly through the lower member of the slide, the base having means for engaging the depending arm of the bell crank lever, and a spring on the upper member of the slide and engaging the operating arm to hold the bell crank lever releasably against movement.

8. A device of the class described, constructed as set forth in claim 3, in combination with means for moving the slide, said means being a bell crank lever fulcrumed on the upper member of the slide, the bell crank lever comprising an operating arm disposed above the upper member of the slide and a depending arm extended downwardly through the lower member of the slide, the base having means for engaging the depending arm of the bell crank lever, and a latch movably mounted on the upper member of the slide and engaging the operating arm to hold the bell crank lever releasably against movement.

9. A device of the class described, a sickle bar, teeth carried by the sickle bar and provided with seats comprising longitudinal parts and transverse parts which open through the rear edges of the teeth, a slide mounted for movement on the sickle bar and having elements shaped for reception in the seats, the slide being movable in one direction to align said elements with the transverse parts of the seats, thereby permitting any tooth to be removed and replaced, the slide being movable in an opposite direction to engage said elements in the longitudinal parts of the seats and thereby to retain teeth on the bar, and means for holding the teeth against movement longitudinally of the bar.

FRANK CHESLEY MISH.